Nov. 19, 1957  E. PARADIS ET AL  2,813,438
CHAIN-SAW SHARPENING DEVICE
Filed Feb. 6, 1956  4 Sheets-Sheet 1
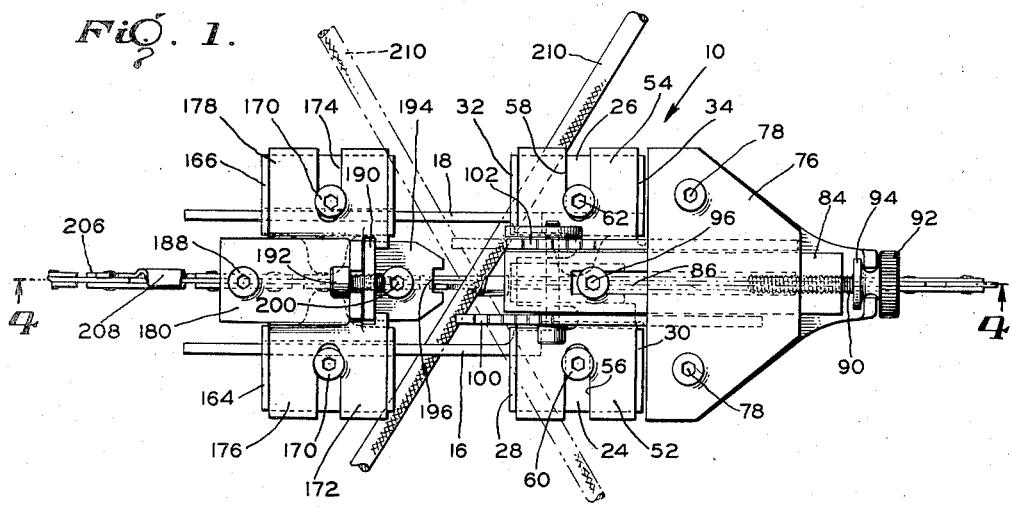
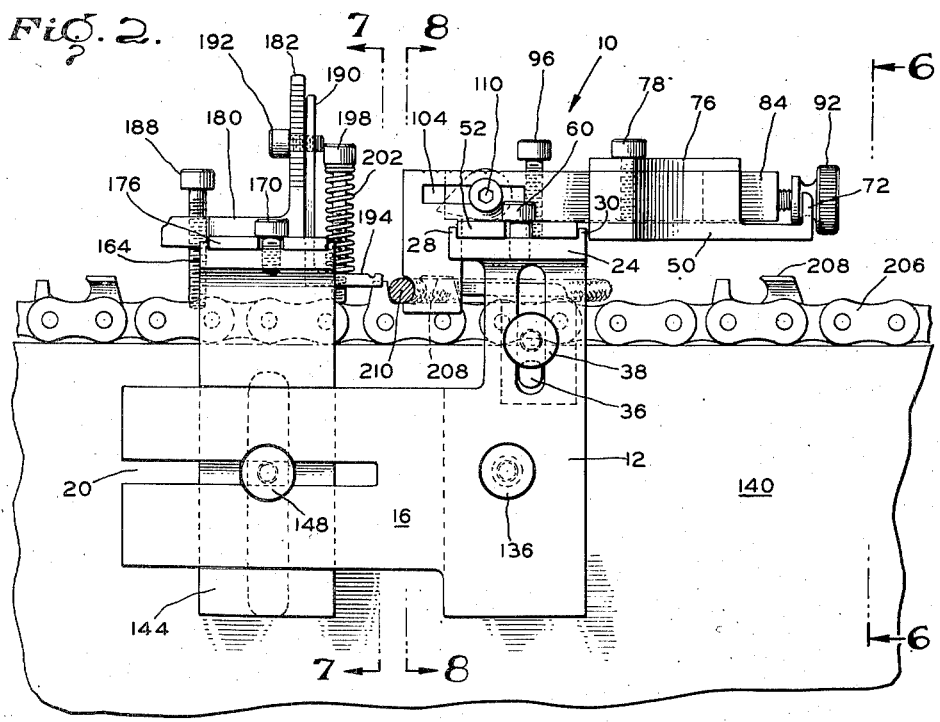
INVENTORS
*Ernest Paradis.*
*Romeo Paradis.*
BY *Gustave Miller*
ATTORNEY

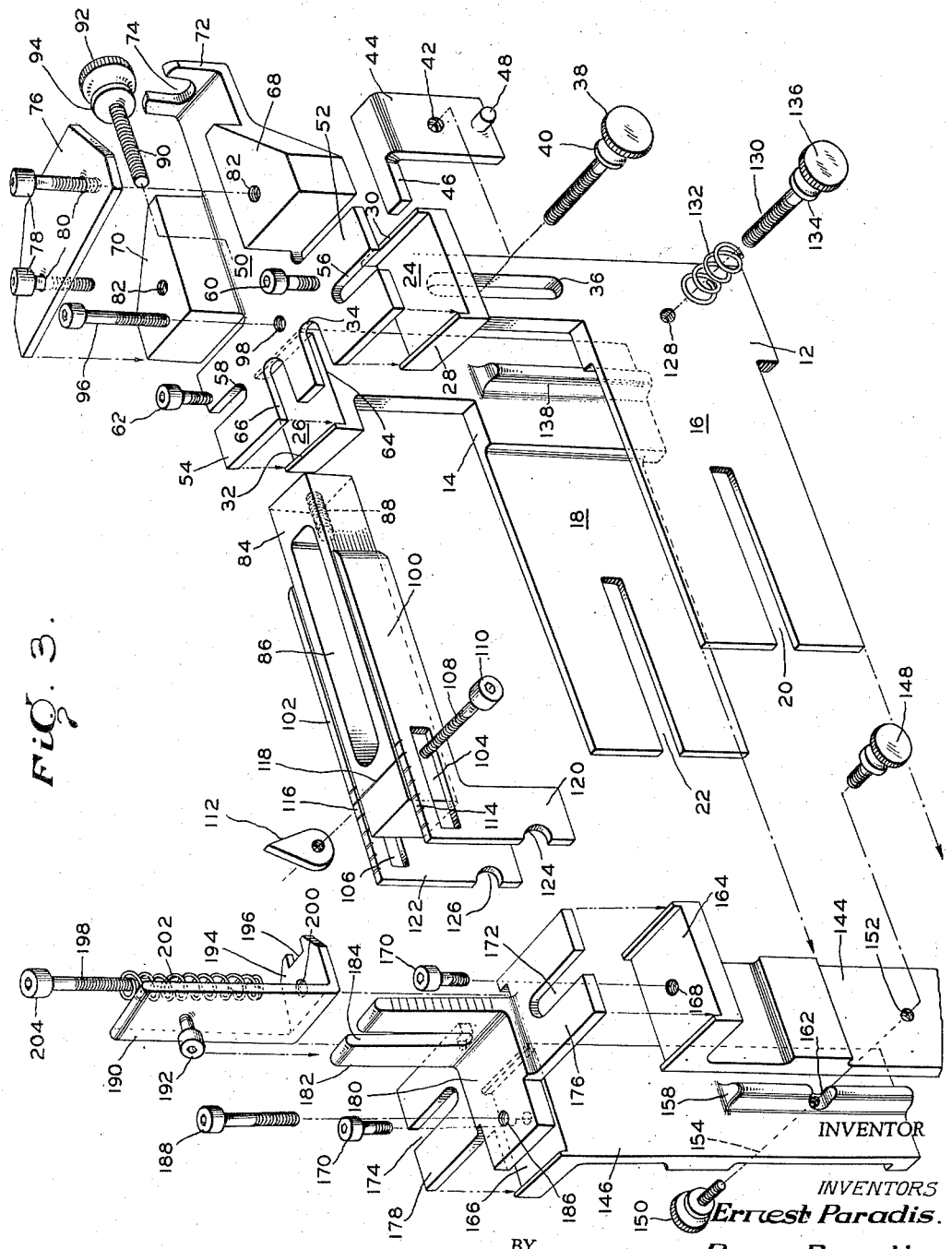

Nov. 19, 1957  E. PARADIS ET AL  2,813,438
CHAIN-SAW SHARPENING DEVICE
Filed Feb. 6, 1956  4 Sheets-Sheet 3
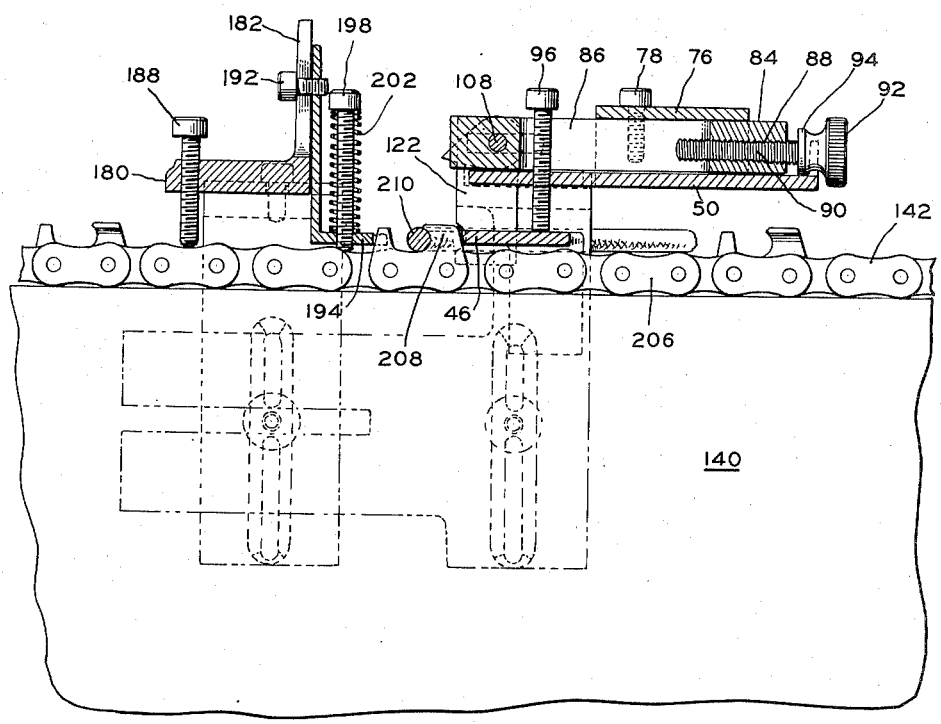
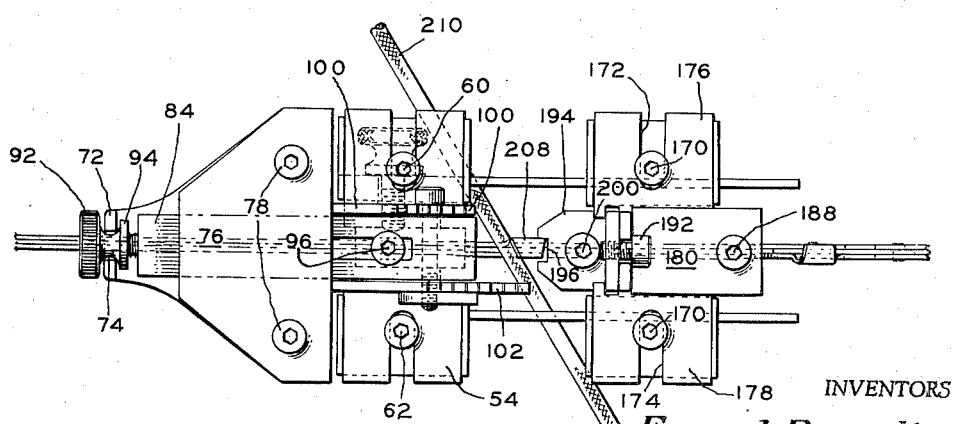
INVENTORS
Ernest Paradis
Romeo Paradis
BY Gustave Miller
ATTORNEY Nov. 19, 1957  E. PARADIS ET AL  2,813,438
CHAIN-SAW SHARPENING DEVICE
Filed Feb. 6, 1956  4 Sheets-Sheet 4
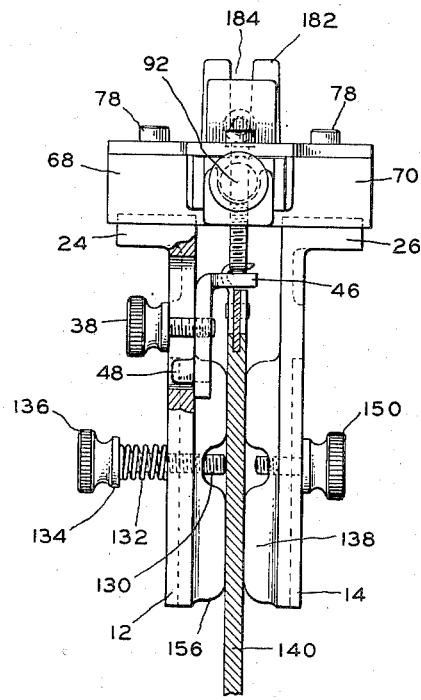
Fig. 6.
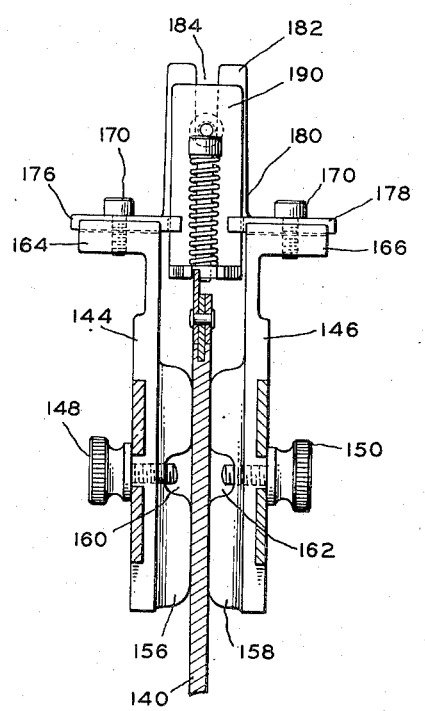
Fig. 7.
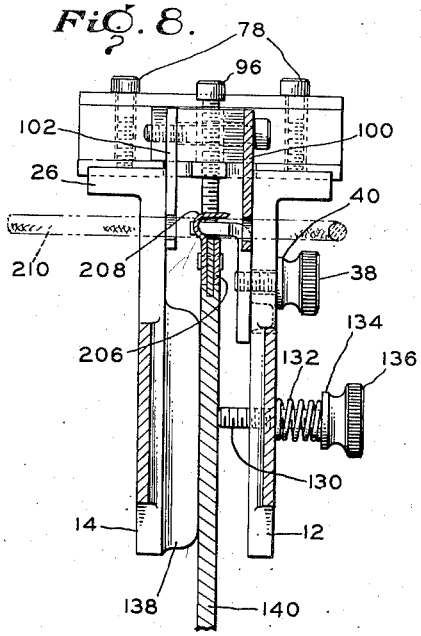
Fig. 8.
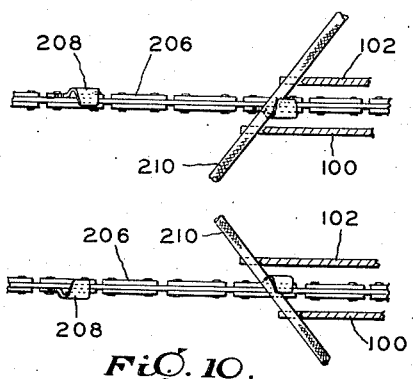
Fig. 9.
Fig. 10.
INVENTORS
Ernest Paradis.
Romeo Paradis.
BY Gustave Miller
ATTORNEY

United States Patent Office 2,813,438
Patented Nov. 19, 1957

2,813,438

CHAIN-SAW SHARPENING DEVICE

Ernest Paradis, Oakfield, and Romeo Paradis,
Glens Falls, N. Y.

Application February 6, 1956, Serial No. 563,684

4 Claims. (Cl. 76—31)

This invention relates to a saw-sharpening mechanism, and it particularly relates to a saw-sharpening mechanism for chain-saws.

One object of the present invention is to provide a chain-saw sharpening device which is adapted, while maintaining the saw in fixed, adjustable position, to provide a guide means to enable the teeth of the saw to be sharpened from various angles.

Another object of the present invention is to provide a chain-saw sharpening device which is adjustable to vary the contour of the hook portion of the saw teeth.

Other objects of the present invention are to provide an improved sharpening device, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a top plan view of a device embodying the present invention.

Fig. 2 is a side elevational view of the device.

Fig. 3 is an exploded, perspective view of the device.

Fig. 4 is a vertical sectional view taken substantially on line 4—4 of Fig. 1.

Fig. 5 is a view similar to Fig. 1, but in reverse, and showing more details.

Fig. 6 is a rear elevational view taken on line 6—6 of Fig. 2.

Fig. 7 is a sectional view taken on line 7—7 of Fig. 2.

Fig. 8 is a sectional view taken on line 8—8 of Fig. 2.

Figs. 9 and 10 are views showing the tool guides in two opposite positions of adjustment.

Referring now in greater detail to the drawings wherein similar reference characters refer to similar parts, there is shown a mechanism, generally designated 10, which comprises a pair of brackets 12 and 14 having horizontal extension plates 16 and 18, each of which is provided with a longitudinal slot at the free end thereof as at 20 and 22.

At the upper end of each bracket 12 and 14 there is provided a laterally-extending platform, as at 24 and 26. Each of these platforms is provided with upwardly-extending flanges at its forward and rearward edges, as at 28 and 30 on platform 24, and at 32 and 34 on platform 26.

The bracket 14 is imperforate, but the bracket 12 is provided with a vertical slot 36 through which extends a set-screw 38. The screw 38 is adapted to engage in a threaded opening 42 in a plate 44 having a finger 46 at the upper end thereof. The plate 44 is provided with a lug 48 at the bottom portion thereof.

The plate 44 is adapted to be positioned against the inner surface of the bracket 12 with its lug slidably positioned within slot 36, and with the finger 46 projecting forwardly between the two brackets 12 and 14. The set-screw 38 is loosened in order to permit vertical adjustment of the plate 44. During such adjustment, the lug 48 acts as a guide within slot 36. When the desired position of adjustment is reached, the screw 38 is tightened to lock the plate 44 in position.

A plate 50 is supported on the platforms 24 and 26 by means of oppositely extending lateral arms 52 and 54. These lateral arms are each provided with inwardly-extending slots at their outer edges, as at 56 and 58. Set-screws 60 and 62 are adapted to pass through their respective slots 56 and 58 into corresponding threaded openings in the platforms 24 and 26. The lateral arms 52 and 54 are seated on the platforms between the flanges 28 and 30 or 32 and 34, as the case may be; these flanges acting as guides for the lateral arms.

The plate 50 is laterally adjusted by loosening the screws 60 and 62 and moving the plate right or left as desired, while the flange on the platforms act as guides. When the desired position is reached, the set-screws 60 and 62 are tightened to lock the plate 50 in place.

The plate 50 is also provided with a pair of slots 64 and 66 at its forward edge between the lateral flanges 52 and 54; while at the rearward portion of the plate, there are provided a pair of triangular guides 68 and 70 at either side of the plate. The guides 68 and 70 form a passageway, or slot, therebetween, coincident with the plate 50. At the rear edge of the plate 50, there is provided an upstanding flange 72 having a U-shaped slot 74 therein.

A plate 76 is adapted to overlie the guides 68 and 70 to form a housing therewith. Set-screws 78 are adapted to threadedly engage corresponding openings 80 and 82 in the plate 76 and in the guides 68 and 70 respectively.

Within the passage formed between the guides 68 and 70, there is slidably positioned a block 84 having a central, elongated slot 86 therein. The rear end of the block 84 is provided with a threaded bore 88 in which is engaged the threaded stem of an adjusting screw 90. This screw 90 has a head 92 and an inner flange 94, the head being positioned on the opposite side of the flange 72. This screw 90 is used to longitudinally adjust the block 84 which is supported on the plate 50.

A set-screw 96 extends through the slot 86 in the block 84, and through a threaded opening 98 in the plate 50, and acts as an adjustable limit stop for the vertical adjustment of the finger 46 on the plate 44. This screw 96 also acts as an additional guide for the block 84 because of the positioning of the fixed screw within the slot 86.

At the opposite sides of the block 84 there are provided a pair of slides 100 and 102, each having a slot at its forward end, as at 104 and 106. A set-screw 108 is adapted to pass through the slots 104 and 106 with the head 110 of the screw at one side of the slot 104 in plate 100, and with an adjusting dog 112 on the tip of the screw at the other side of the slot 106 in slide 102. The screw 108 and dog 112 are tightened to hold the two slides 100 and 102 in individual positions of adjustment relative to the block 84.

Depending from the front end of each slide 100 and 102 is a foot, as at 120 and 122, each of these feet having a groove, as at 124 and 126. At the lower portion of the bracket 12 is provided a threaded opening 128 through which extends a set-screw 130; a coil spring 132 being positioned on this screw 132 between the bracket and a flange 134 on the screw head 136. The other bracket 14 is provided on its lower internal surface with a vertical rib 138. The rib 138 and the adjustable screw 130 are adapted to releasably clamp the device on the support 140 of a chain saw 142, as best seen in Fig. 8.

At the fore end of the device, there is provided a front clamping means comprising a pair of brackets 144 and 146, each of which is connected to the corresponding arm 16 and 18 of the brackets 12 and 14; these connections being by means of set-screws 148 and 150 which extend through slots 20 and 22 respectively into threaded openings 152 and 154 on the respective brackets 144 and 146. By loosening the screws 148 and 150, the brackets 144 and 146 are slidably adjustable along the length of the slots 20 and 22.

Each bracket 144 and 146 is provided a vertical flange, as at 156 and 158 having central recesses, as at 160 and 162, to receive the ends of the screws. These flanges 156 and 158 are adapted to clamp against the fore end of the chain-saw support 140.

At the upper end of each bracket 144 and 146 is provided a platform, as at 164 and 166. A threaded opening 168 is provided in the top of each platform 164 and 166, each of these openings being adapted to receive a set-screw 170 which extends through a slot, as at 172 and 174, in the lateral flanges 176 and 178 of a support member 180. By this means, the member 180 can be adjusted laterally in either direction.

Extending upwardly from the rear edge of the support member 180 is a flange 182 having a vertical slot 184. At the fore end of the support member 180 is provided a threaded opening 186 through which extends a screw 188.

A plate 190 is slidably positioned on the rear surface of the flange 182 by means of a set-screw 192 extending through the slot 184 in flange 182. At the bottom end of this plate 190 is provided a horizontal tongue 194 having a recess in the free end thereof. A screw 198 is threadedly engaged in an opening 200 in tongue 194 and extends upwardly therefrom. A coil spring 202 surrounds the screw 198 between the tongue 194 and the screw head 204.

In operation, the mechanism 10 is placed astride the chain-saw device and clamped to the sides thereof by means of the screw 130 and the flanges 138, 156 and 158, as best shown in Figs. 6, 7 and 8. The chain 206 of the saw device is then passed through the mechanism until one of its teeth 208 is in position. The screw 38 is then loosened and the plate 44 is adjusted to the desired height; after which the screw 38 is tightened.

The height of the plate 44, and, therefore, of the finger 46, is adjusted in accordance with the desired contour of the hook portion of the tooth. This contour depends on the position of the finger 46 which acts as a backing means for the tooth during filing. If the finger is high, the hook will be relatively shallow, whereas if the finger is lower, the cut will be deeper into the side of the tooth and the upper portion of the tooth will be of greater concavity. The screw 96 acts as an adjustable limit stop to prevent excessive raising of the finger 46.

After the height of the finger 46 has been adjusted, the screws 188 and 198 are adjusted so that they bear on the chain length and act to frictionally hold it in place. The spring 202 on the screw 198 acts as a shock absorber for the vibrations caused by the filing action and also acts to hold the screw 198 securely in place during such filing. The grooved tongue 194 meanwhile acts as a backing or cradling member for the opposite end of the tooth.

The block 84 is then longitudinally adjusted to the desired position and the slides 100 and 102 are adjusted to the desired relative angles. The file 210 is then passed back and forth across the tooth to sharpen it, the angle of attack of the file being formed by the slides 100 and 102 by means of the grooves 124 and 126 through which it passes. When the angle of attack of the file is to be changed or reversed, the slides 100 and 102 are merely adjusted to the new or reversed relative angle.

After one tooth has been sharpened, the various chain-clamping screws and backing members are loosened and the chain is moved to bring the next tooth into the operative position, after which they are again tightened.

If necessary, the mechanism can be adjusted laterally to compensate for saw teeth which are out of line by means of the laterally adjustable arms 52, 54, 176 and 178.

This invention is an improvement on the invention shown in the application for Chain Saw Filing Tool, filed February 1, 1954, Serial No. 407,372, issued February 28, 1956, Patent No. 2,736,216.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A chain-saw sharpening device comprising a first pair of brackets, an arm extending from each of said first pair of brackets, said arms being parallel to each other, a second pair of brackets, each of which is adjustably connected to a corresponding arm along at least a portion of the length of said arms, a platform at the upper end of each of said brackets, a housing mounted on the platforms of said first pair of brackets for lateral adjustment thereon, a vertical guide plate mounted on the platforms of said second pair of brackets for lateral adjustment thereon, a guide block longitudinally adjustable through said housing and extending toward said guide plate, a pair of parallel, spaced slides mounted for longitudinal adjustment on said guide block, said slides being individually adjustable, tool-guiding recesses on each of said slides, a backing member positioned for vertical adjustment between said first pair of brackets, below said guide blocks, and a yoke extending from the lower end of said guide plate toward said first pair of brackets.

2. The device of claim 1 wherein adjustable, frictional engaging members are supported by said second pair of brackets for engaging the chain-saw to hold it steady during the sharpening of a tooth thereon.

3. The device of claim 1 wherein means are provided on said brackets to clamp said device to a chain-saw support.

4. The device of claim 1 wherein a linear scale is provided on each of said slides for cooperation with an indicia mark on said guide block.

References Cited in the file of this patent

UNITED STATES PATENTS 2,677,289    Fitch  ---------------- May 4, 1954